United States Patent
Barakat

(10) Patent No.: US 7,573,782 B2
(45) Date of Patent: Aug. 11, 2009

(54) SEISMIC ACQUISITION SYSTEM

(75) Inventor: Simon Barakat, Oslo (NO)

(73) Assignee: WesternGeco L. L. C., Houston, TX (US)

(*) Notice: Subject to any disclaimer, the term of this patent is extended or adjusted under 35 U.S.C. 154(b) by 57 days.

(21) Appl. No.: 10/532,644

(22) PCT Filed: Nov. 21, 2003

(86) PCT No.: PCT/EP03/50872

§ 371 (c)(1),
(2), (4) Date: Aug. 10, 2006

(87) PCT Pub. No.: WO2004/048144

PCT Pub. Date: Jun. 10, 2004

(65) Prior Publication Data

US 2006/0291327 A1  Dec. 28, 2006

(30) Foreign Application Priority Data

Nov. 22, 2002 (GB) ................................ 0227293.8

(51) Int. Cl.
*G01V 1/22* (2006.01)
(52) U.S. Cl. .................. 367/77; 367/78; 367/79; 367/80
(58) Field of Classification Search .......... 367/77–80
See application file for complete search history.

(56) References Cited

U.S. PATENT DOCUMENTS 4,885,724 A * 12/1989 Read et al. ................... 367/77

(Continued)

FOREIGN PATENT DOCUMENTS

EP  0 978 733 A2  2/2000

(Continued)

OTHER PUBLICATIONS

International Search Report dated May 11, 2004, for Application No. PCT/EP03/50872.
UK Search Report dated May 6, 2003, for Application No. GB 0227293.8.

* cited by examiner

*Primary Examiner*—Jack W. Keith
*Assistant Examiner*—Scott A Hughes
(74) *Attorney, Agent, or Firm*—Jeffrey A. Pyle; Liangan (Mark) Ye; Jeffrey E. Griffin

(57) ABSTRACT

An apparatus and method for collecting data acquired during a seismic survey are disclosed. The apparatus is a seismic survey system, comprising a plurality of data sources, a plurality of cells, and a plurality of independent pathways. The data sources are positioned about an area to be surveyed, each data source being associated with a transmitter capable of transmitting data. The cells each contain a portion of the data sources and their associated transmitters. One of the transmitters within each cell also serves as a gateway for receiving data transmitted from the other data source transmitters within the cell. The independent pathways each contain a portion of the gateways whereby data may be transmitted along each pathway via the gateways and associated transmitters in that pathway. The method is a method for conducting a seismic survey. The method comprises positioning a plurality of seismic data sources about an area to be surveyed; defining a plurality of cells such that each cell contains a portion of the seismic data sources; defining one of the seismic data sources within each cell to also serve as a gateway; defining a plurality of independent pathways such that each pathway contains a portion of the gateways; within each respective cell, transmitting seismic data from the seismic data sources to the gateway; and, within each pathway, transmitting the seismic data from one gateway to another to reach a central location.

25 Claims, 9 Drawing Sheets

U.S. PATENT DOCUMENTS

| | | | |
|---|---|---|---|
| 5,428,636 A * | 6/1995 | Meier | 375/132 |
| 5,627,798 A | 5/1997 | Siems et al. | |
| 5,706,250 A | 1/1998 | Rialan et al. | |
| 6,208,247 B1 * | 3/2001 | Agre et al. | 340/539.19 |
| 6,219,620 B1 | 4/2001 | Park et al. | |
| 6,226,601 B1 | 5/2001 | Longaker | |
| 6,424,931 B1 | 7/2002 | Sigmar et al. | |
| 2001/0039478 A1 | 11/2001 | Bary et al. | |
| 2002/0082811 A1 * | 6/2002 | Honjas et al. | 703/2 |

FOREIGN PATENT DOCUMENTS

| | | |
|---|---|---|
| EP | 0978733 A2 | 2/2000 |
| JP | 10-31075 | 2/1998 |
| JP | P2000-310075 A | 7/2000 |
| WO | WO 98/07049 | 2/1998 |
| WO | WO 9807049 A2 | 2/1998 |
| WO | WO 98/18022 | 4/1998 |
| WO | WO 9818022 A1 | 4/1998 |

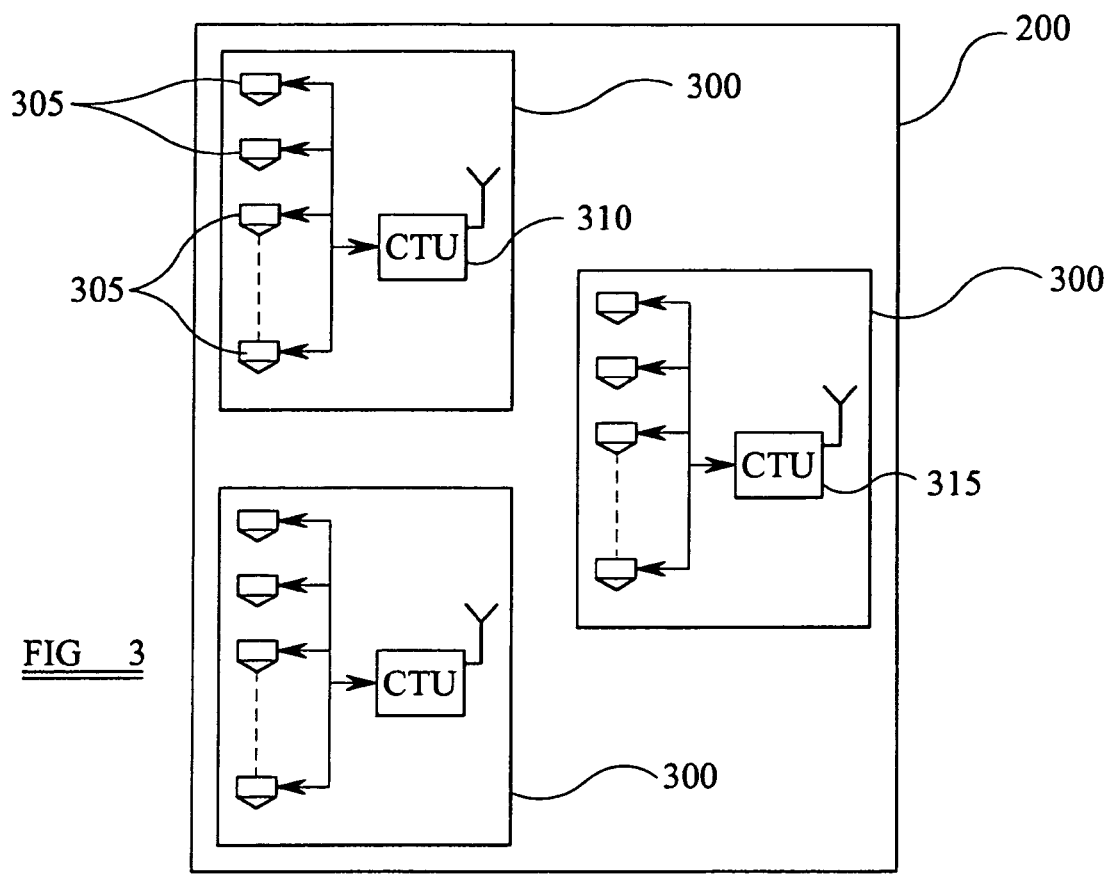
FIG 3
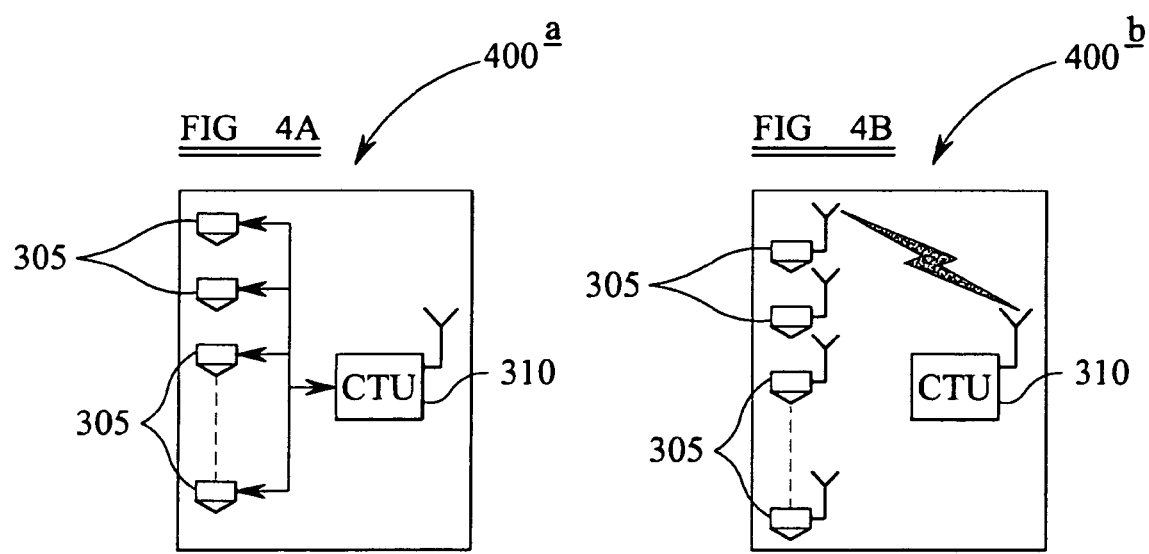
FIG 4A
FIG 4B

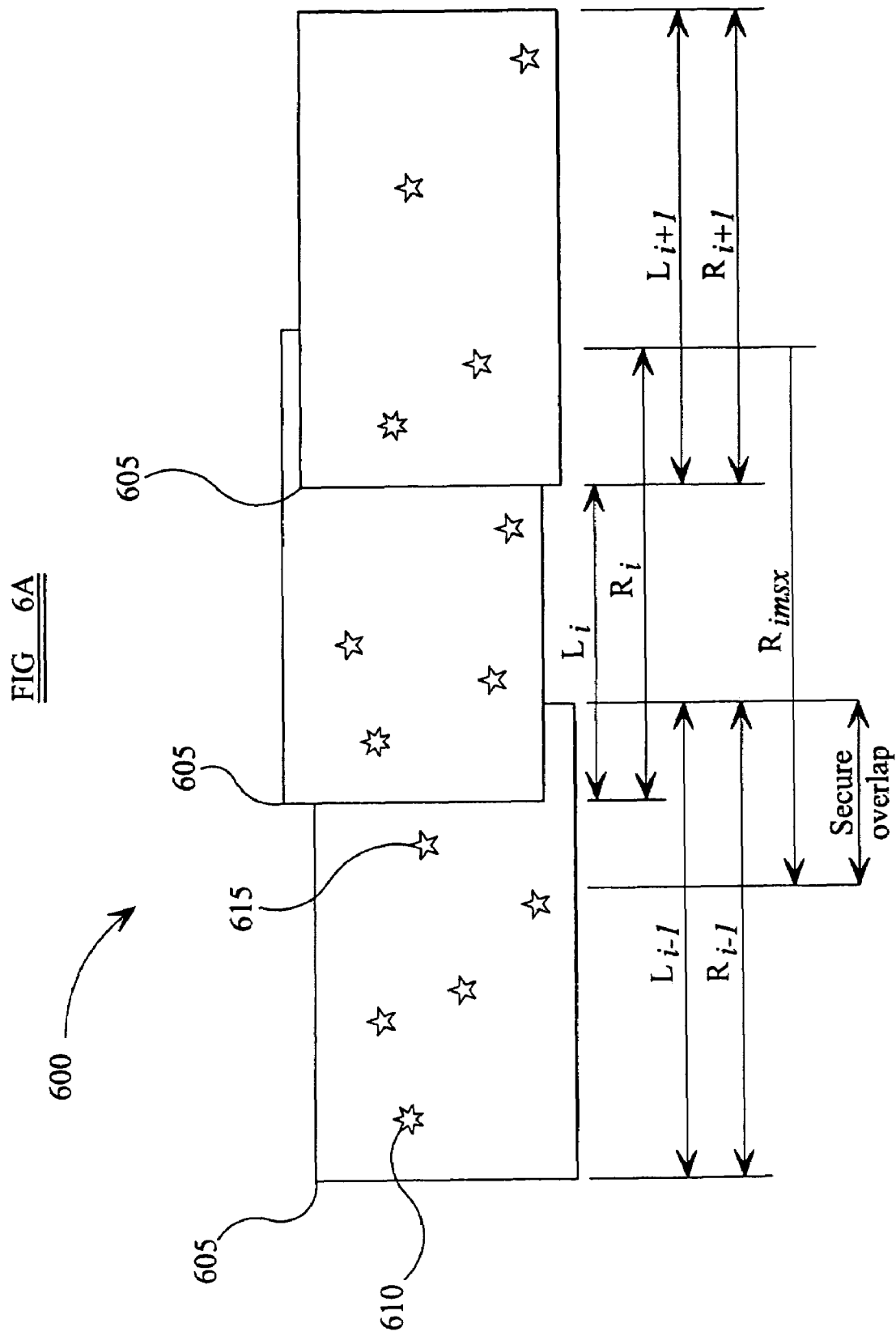

SEISMIC ACQUISITION SYSTEM

BACKGROUND OF THE INVENTION

1. Field of the Invention

The present invention pertains to seismic acquisition, and, more particularly, to a method of collecting data during a seismic acquisition.

2. Description of the Related Art

Seismic surveying traditionally involves imparting acoustic waves from an acoustic source that propagate through subterranean geological formations and are reflected back to seismic sensors. The seismic sensors are deployed in arrays and are positioned through the area being surveyed. The reflected signals are transformed into electrical or optical signals that are then transmitted over electrical or optical cables to a data collection unit. In a land-based survey, the data collection unit is usually housed on a recording truck. The data collection unit either records the signals it receives, analyzes them in real-time, transmits them to a remote location for analysis, or some combination of these things.

Recent trends in seismic surveying are producing larger arrays of seismic sensors. These arrays are larger both in terms of coverage area and in terms of the number of seismic sensors. The larger arrays adversely impact the cost of conducting the survey. Not only do these larger arrays employ more pieces of equipment, but their extended coverage area lengthen deployment time. The more time it takes to deploy the array, and the more pieces of equipment it uses, the more expensive the survey.

Attempts in the art to address these factors include U.S. Pat. No. 6,226,601, entitled "Seismic Survey System," and issued May 1, 2001, to Trimble Navigation Limited as assignee of the inventor Harold L. Longaker ("the '601 patent"). In particular, this patent discloses a wireless seismic system in an effort to eliminate, or at least minimize, cabling. The system includes multiple layers of "cells." The seismic sensors are grouped in a particular fashion, and each group of seismic sensors wirelessly transmits its data to a dedicated, first level transceiver. The first level transceivers are similarly grouped, and each group of first level transceivers wirelessly transmits the data accumulated from its group of seismic sensors to a dedicated, second level transceiver. This process repeats, and each higher level sees a further consolidation of data from the previous layer. At some point, the data is completely consolidated or has reached some desired level of consolidation. The consolidated data is then wirelessly transmitted to a data collection unit.

Conventional wireless approaches, such as the one in the '601 patent mentioned above, use a variety of communications protocols. These communications protocols include:

- GSM-DCS, or Global System for Mobile Communications-Digital Cellular System, which employs a form of time-division multiplexing called Time Division Multiple Access "TDMA"), used for cellular telephony in much of Europe and Asia;
- UMTS, or Universal Mobile Telecommunications System, used to deliver broadband information at speeds up to 2 Mbit s/sec, including audio and video, to wireless devices anywhere in the world through fixed, wireless and satellite systems;
- DECT, or Digitally Enhance Cordless Telecommunications, a common standard for cordless personal telephony originally established by the European Telecommunications Standards Institute ('ETSI'), a European standardization body, for cordless business communications;
- CDMA, or Code-Division Multiple Access, a digital cellular technology that uses spread-spectrum techniques; and
- GPRS, or General Packet Radio Service, a standard for wireless communications which runs at speeds up to 115 kilobits per second and supports a wide range of bandwidths.

However, the application of each of these protocols brings its own problems. For instance:

- UMTS, DECT, and CDMA are telephony oriented, rather than network oriented, which imposes undesirable restrictions on communication of data in a seismic acquisition environment;
- UMTS is unproven in terms of its components;
- UMTS and GSM have the same upstream bandwidth as downstream bandwidth, which is wasteful in a seismic acquisition system needing a much higher upstream bandwidth than downstream bandwidth;
- GPRS allocates more than one channel downstream and sometimes none upstream, which is contrary to the needs of a seismic acquisition system;
- GSM-DSC causes a poor use of the number of channels in the cell versus the possible range of the cell because of a disparity between the density of geophones in the cell and the surface area of the cell; and
- GSM-DSC still employs a wire between its base transceiver unit ("BTS") and the Basic Station Controller ("BSC") and between the BSC and the central recording and processing system.

Thus, current wireless techniques applied in seismic acquisition leave much to be desire.

The present invention is directed to resolving, or at least reducing, one or all of the problems mentioned above.

SUMMARY OF THE INVENTION

The invention includes, in its various embodiments and aspects, an apparatus and method for collecting data acquired during a seismic survey.

The apparatus is a seismic survey system, comprising a plurality of data sources, a plurality of cells, and a plurality of independent pathways. The data sources are positioned about an area to be surveyed, each data source being associated with a transmitter capable of transmitting data. The cells each contain a portion of the data sources and their associated transmitters. One of the transmitters within each cell also serves as a gateway for receiving data transmitted from the other data source transmitters within the cell. The independent pathways each contain a portion of the gateways whereby data may be transmitted along each pathway via the gateways and associated transmitters in that pathway.

The method is a method for conducting a seismic survey. The method comprises positioning a plurality of seismic data sources about an area to be surveyed; defining a plurality of cells such that each cell contains a portion of the seismic data sources; defining one of the seismic data sources within each cell to also serve as a gateway; defining a plurality of independent pathways such that each pathway contains a portion of the gateways; within each respective cell, transmitting seismic data from the seismic data sources to the gateway;

and, within each pathway, transmitting the seismic data from one gateway to another to reach a central location.

BRIEF DESCRIPTION OF THE DRAWINGS

The invention may be understood by reference to the following description taken in conjunction with the accompanying drawings, in which like reference numerals identify like elements, and in which:

FIG. 3 depicts a grouped data acquisition cell from FIG. 2 in greater detail;

FIG. 4A and FIG. 4B illustrate alternative implementations of a basic data acquisition cell such as may comprise the grouped data acquisition cell of FIG. 3;

FIG. 6A, FIG. 6B, and FIG. 6C illustrate one particular embodiment in which grouped data acquisition cells overlap;

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
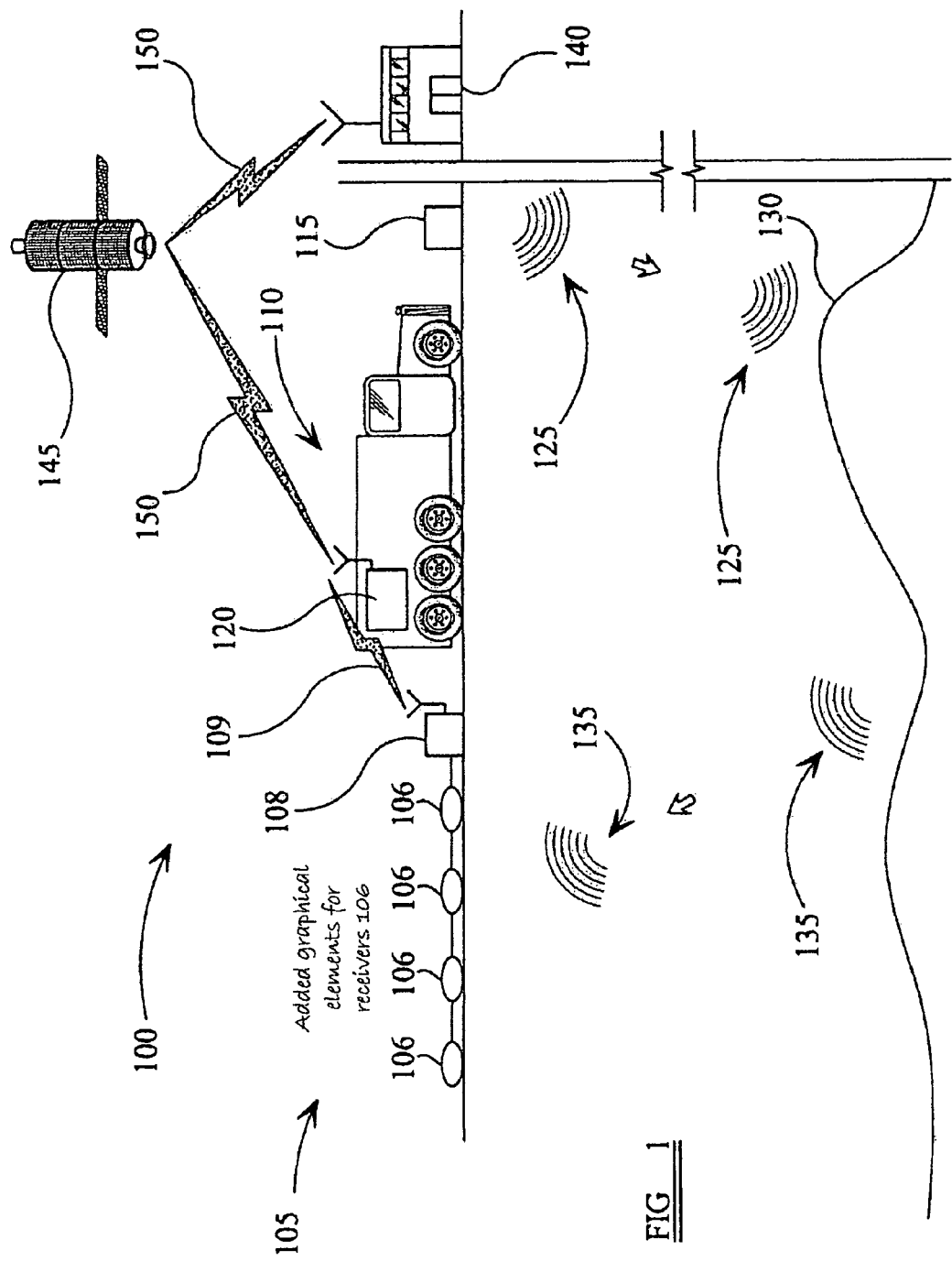
FIG. 1 illustrates a land-based seismic survey employing a seismic array constructed, deployed, and operated in accordance with one particular embodiment of the present invention FIG. 2 conceptually illustrates the seismic array in FIG. 1.

FIG. 1 illustrates a land-based seismic survey employing a seismic survey system 100 in accordance with the present invention. The apparatus includes a seismic recording array 105 constructed, deployed, and operated as discussed further below. The seismic recording array 105 includes a plurality of data sources 106 positioned about an area to be surveyed, each data source 106 being associated with a transmitter 108 capable of wirelessly transmitting data collected by the data sources 106, as indicated by the wireless link 109. The data sources 106 are implemented, in the illustrated embodiment, with, e.g., conventional geophones as are known to the art.

FIG. 1 shows the seismic recording array 105 connected to the recording truck 110 via the wireless link 109. A seismic source 115 is also shown. A data collection unit 120 is shown centrally located on the recording truck 110. However, as will be appreciated by those skilled in the art, various portions of the data collection unit 120 may be distributed in whole or in part, e.g., across the seismic recording array 105, in alternative embodiments. The seismic source 115 generates a plurality of seismic survey signals 125 in accordance with conventional practice. The seismic survey signals 125 propagate and are reflected by the subterranean geological formation 130. The seismic data sources 120 receive the reflected signals 135 off the geological formation 130 in a conventional manner.

The seismic data sources 106 then generate data representative of the reflections 135, and the seismic data is embedded in electromagnetic signals. The electromagnetic signals are then communicated to the data collection unit 120 in accordance with the present invention. More particularly, the seismic data sources 106 communicate the seismic data they collect to the data collection unit 120 over the wireless link 109 through the transmitter 108 in a manner discussed more fully below.

The data collection unit 120 collects the seismic data for processing. The data collection unit 120 may process the seismic data itself, store the seismic data for processing at a later time, transmit the seismic data to a remote location for processing, or some combination of these things. In the illustrated embodiment, the data collection unit 120 transmits the seismic data to a fixed-base facility 140 via a satellite 145 and the satellite links 150, although this is not necessary to the practice of the invention. Ultimately, in accordance with the present invention, the data collected by the seismic data sources 106 is transmitted to a central facility or location. This central facility may be a computing and storing center ("CSC"), e.g., the recording truck 110 or the fixed-base facility 140.

Figure 2:
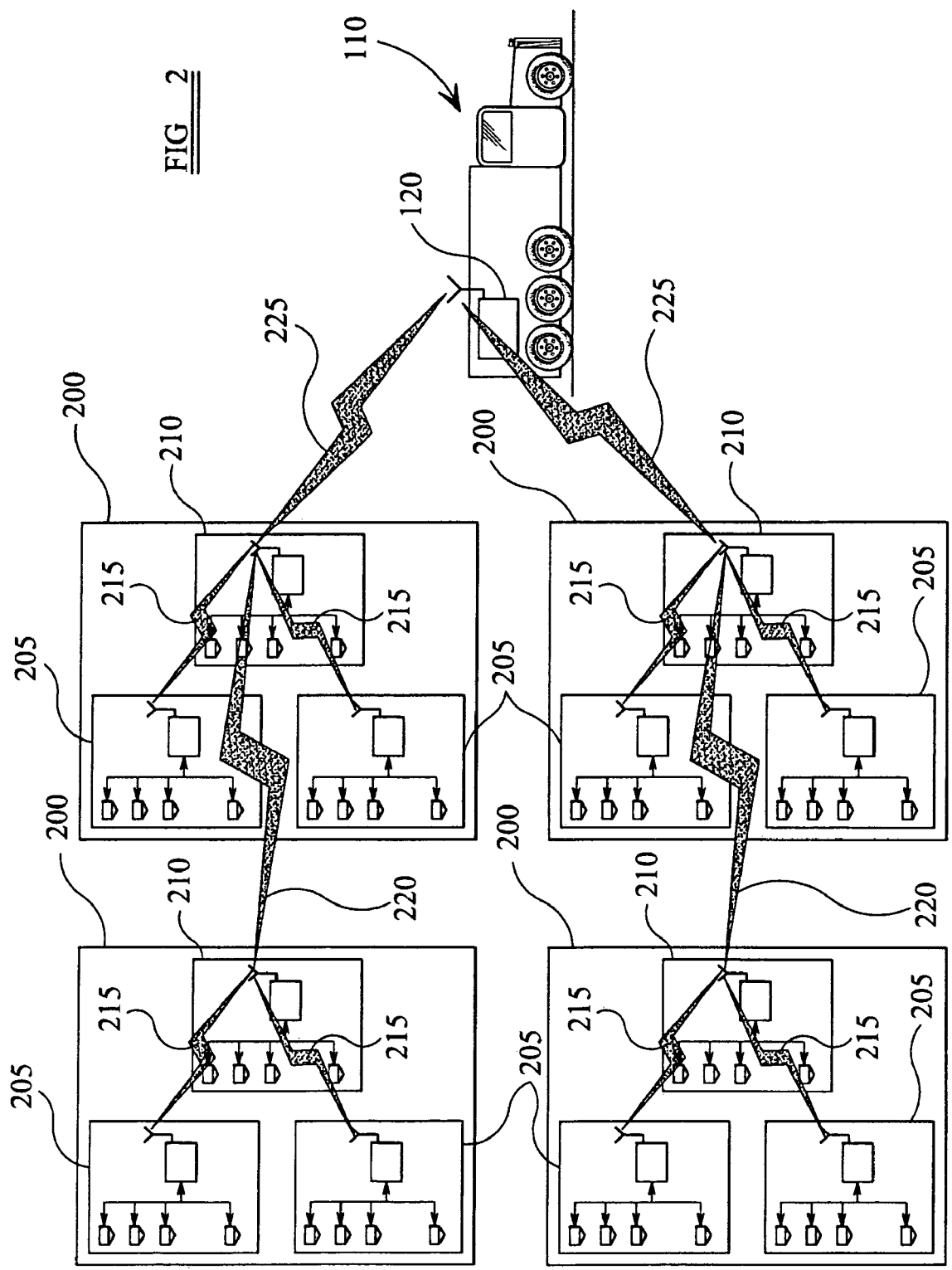

FIG. 2 conceptually illustrates the arrangement of the data sources 106 in the seismic recording array 105 in FIG. 1. The seismic array 105 comprises a plurality of grouped data acquisition cells ("GDACs") 200. In the illustrated embodiment, there are four, but the invention is not so limited. The number of GDACs 200 will vary by implementation. An individual GDAC 200 is depicted in FIG. 3. Each GDAC 200 comprises a plurality of basic data acquisition cells ("BDACs") 300. The number of BDACs 300 in each 200 is not material to the practice of the invention, but three BDACs 300 are shown in the GDAC 200 of FIG. 3. Note that the number of BDACs 300 in any given GDAC 200 may vary. For instance, one GDAC 200 may comprise three BDACs 300 while another GDAC 200 in the same array may comprise four BDACs 300.

Each BDAC 300 comprises a plurality of seismic sensors 305 and a central transmission unit 310. She connections between the seismic sensors 305 and the central transmission units 310 may be wired, as in the BDAC 400a in FIG. 4A, or wireless, as in the BDAC 400b in FIG. 4B. The seismic sensors 305 will typically be acquisition devices, e.g., geophones, but other types of seismic sensors may also be employed. For instance, some of the seismic sensors may be positioning devices, e.g., Global Positioning System ("GPS") receivers. Still other kinds of seismic sensors may also be employed. However, in at least one BDAC 300 of each GDAC 200, the transmitter 315 is also capable of receiving seismic data from the other transmitters 310 and transmitting that seismic data along with its own.

Thus, the seismic recording array 105 includes a plurality of cells, e.g., the GDACs 300. Each cell contains a portion of the data sources 106, e.g., the data sources 305, and their associated transmitters, e.g., the transmitters 310. One of the transmitters within each cell, e.g., the transmitter 315, also serves as a "gateway" for receiving data transmitted from the other data source transmitters, e.g., the transmitters 310, within the cell.

Figure 5A:
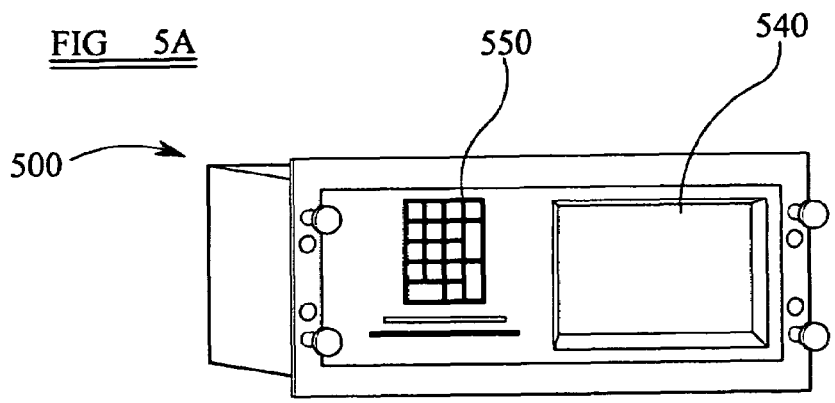
FIG. 5A and FIG. 5B conceptually illustrate a data collection unit as may be used in the embodiment of FIG. 1.
Figure 5B:
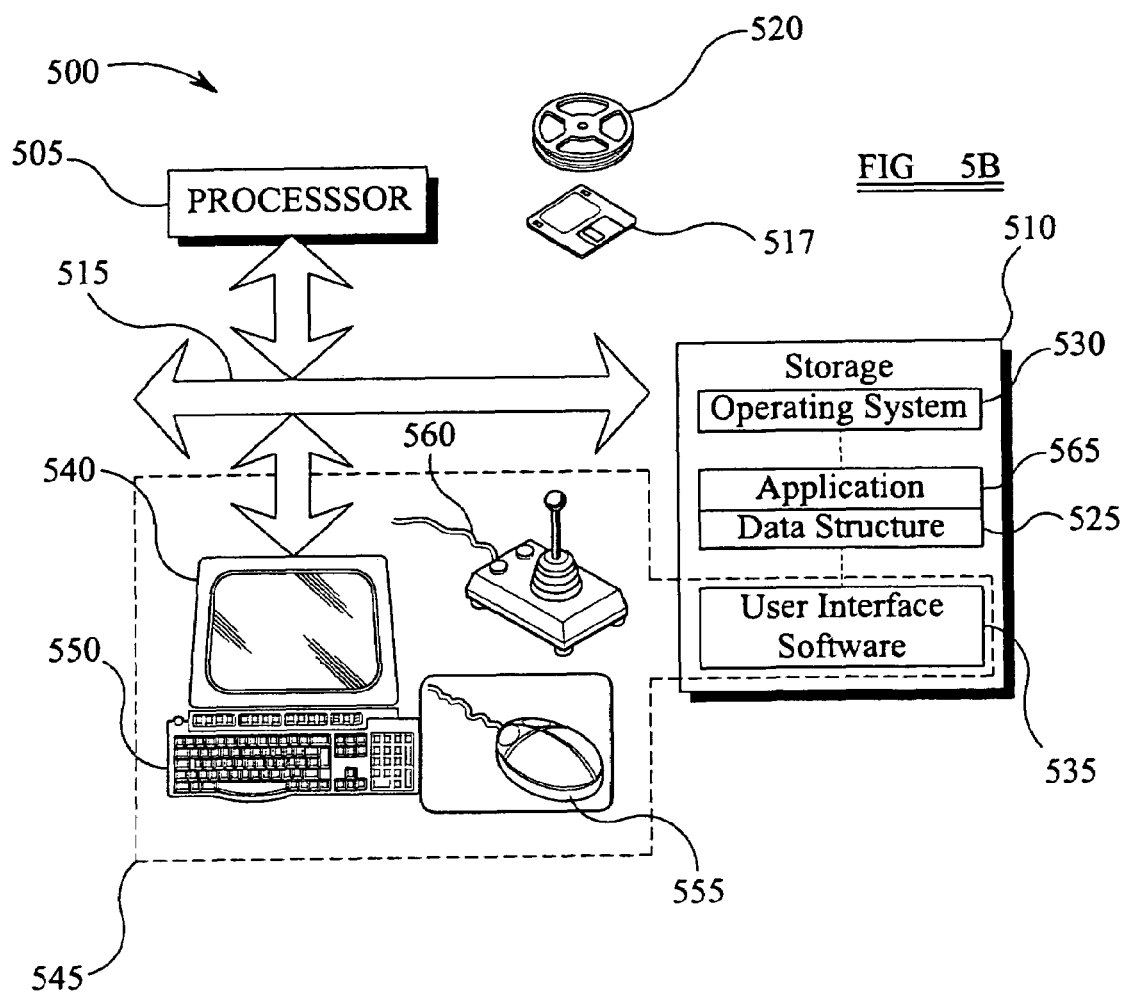

As noted relative to FIG. 1, the seismic survey system 100 includes at least one data collection system 120. Note that some alternative embodiments may employ multiple data collection systems 120. The recording truck 105 is equipped with a rack-mounted computing apparatus 500, illustrated in FIG. 5A and FIG. 5B, with which at least a portion of data collection system 140 is implemented. The computing apparatus 500 includes a processor 505 communicating with some storage 510 over a bus system 515. The storage 510 may include a hard disk and/or random access memory ("RAM") and/or removable storage such is as a floppy magnetic disk 517 and an optical disk 520. The storage 510 is encoded with a data structure 525 storing the data set acquired as discussed above, an operating system 530, user interface software 535, and an application 565. The user interface software 535, in conjunction with a display 540, implements a user interface 545. The user interface 545 may include peripheral I/O devices such as a key pad or keyboard 550, a mouse 555, or a joystick 560. The processor 505 runs under the control of the operating system 530, which may be practically any operating system known to the art. The application 565 is invoked by the operating system 530 upon power up, reset, or both, depending on the implementation of the operating system 530.

Referring again to FIG. 1, the acoustic waves 125, their reception by seismic sensors 300 (first shown in FIG. 3), and the generation of data from the reflections 135 may be performed in conventional fashion. Thus, for instance, the seismic source 115 may be any seismic source known to the art, e.g., a vibrator or an explosive charge. Similarly, the seismic sensors 305 (first shown in FIG. 4 may implemented using any type of seismic sensor known to the art and suitable for the survey being implemented.

Data transmission to the data collection unit 120, however, is performed in accordance with the present invention. One BDAC 300 in each GDAC 200 is a "gateway" to the GDAC 200. All communications to and from any BDAC 300 in the GDAC 200 to and from the central location mentioned above (e.g., the data collection unit 120) proceeds through the gateway BDAC 300. It is not material to the practice of the invention which particular BDAC 300 is designated the gateway, although range and power considerations in any given implementation may influence the designation.

Referring now again to FIG. 2, each BDAC 205 that is not a gateway 210 transmits its data via its central transmitting unit 310 (first shown in FIG. 3) to the gateway 210 of its GDAC 200, as represented by the wireless links 215. The gateway 210 collects the data from the other BDACs 205 and wirelessly transmits the accumulated data to the next GDAC 200 in the direction of the data collection unit 120, as represented by the wireless links 220. If there is no such GDAC 200, then the data is wirelessly transmitted directly to the recording unit 120, as represented by the wireless link 225. Thus, seismic data is transmitted in this "cascaded" fashion across the seismic recording array 105 and, ultimately to a CSC. Note that the any given GDAC 200 receives data transmitted by only one other GDAC 200. Thus, the wireless links 220, 225 represent a plurality of independent pathways, each containing a portion of the gateways whereby data may be transmitted along each pathway via the gateways and associated transmitters in that pathway. In some embodiments, information can also be transmitted to the BDACs 205 and gateways 210 back over these same pathways.

Data can be transmitted between GDACs 200 in one of at least two ways. First, data may be transmitted in a continuous, or asynchronous, mode. In this mode, gateway $210_i$ transmits to gateway $210_{i+1}$ when data is ready for transmission, without regard for when gateway $210_{i+1}$ transmits data to $210_{i+2}$. In this fashion, each gateway 210 receives data transmitted to it, assembles it with its own data, and transmits the resultant data set to the next gateway 210 in the pathway until the data reaches the data collection unit 120. Second, data may be transmitted in a discontinuous, or synchronous, mode. In this mode, data is transferred from gateway $210_i$ to gateway $210_{i+1}$ at the same time gateway $210_{i+2}$ transmits data to $210_{i+3}$ and at predefined periods. In the next predefined period, data is transferred from gateway $210_{i+1}$ to gateway $210_{i+2}$ at the same time gateway $210_{i+3}$ transmits data. Thus, at a predetermined time half of the gateways 210 transmit what data it has to the next gateway 210 in the pathway and, at the next predetermined time, the second half transmits its data to the next gateway 210.

In the illustrated embodiment, the data is transmitted over the wireless links 220, 225 using the 802.11 standard. The 802.11 standard is a family of specifications developed by the Institute of Electrical and Electronics Engineers ("IEEE") for wireless local area network ("LAN") technology. 802.11 specifies an over-the-air interface between a wireless client and a base station or between two wireless clients. There are several specifications in the 802.11 standard, including:

802.11—applies to wireless LANs and provides 1 or 2 Mbps transmission in the 2.4 GHz band using either frequency hopping spread spectrum ("FHSS") or direct sequence spread spectrum ("DSSS").

802.11a—an extension to 802.11 that applies to wireless LANs and provides up to 54 Mbps in the 5 GHz band. 802.11a uses an orthogonal frequency division multiplexing encoding scheme rather than FHSS or DSSS.

802.11b (also referred to as "802.11 High Rate" or "Wi-Fi")—an extension to 802.11 that applies to wireless LANS and provides 11 Mbps transmission (with a fallback to 5.5, 2 and 1 Mbps) in the 2.4 GHz band. 802.11b uses only DSSS.

802.11g—which applies to wireless LANs and provides 20+ Mbps in the 2.4 GHz band.

Other standards, however, may be used in alternative embodiments. However, in various implementations, the communications over the wireless links 22, 225 may employ either frequency division or time division multiplexing techniques.

Figure 6B:
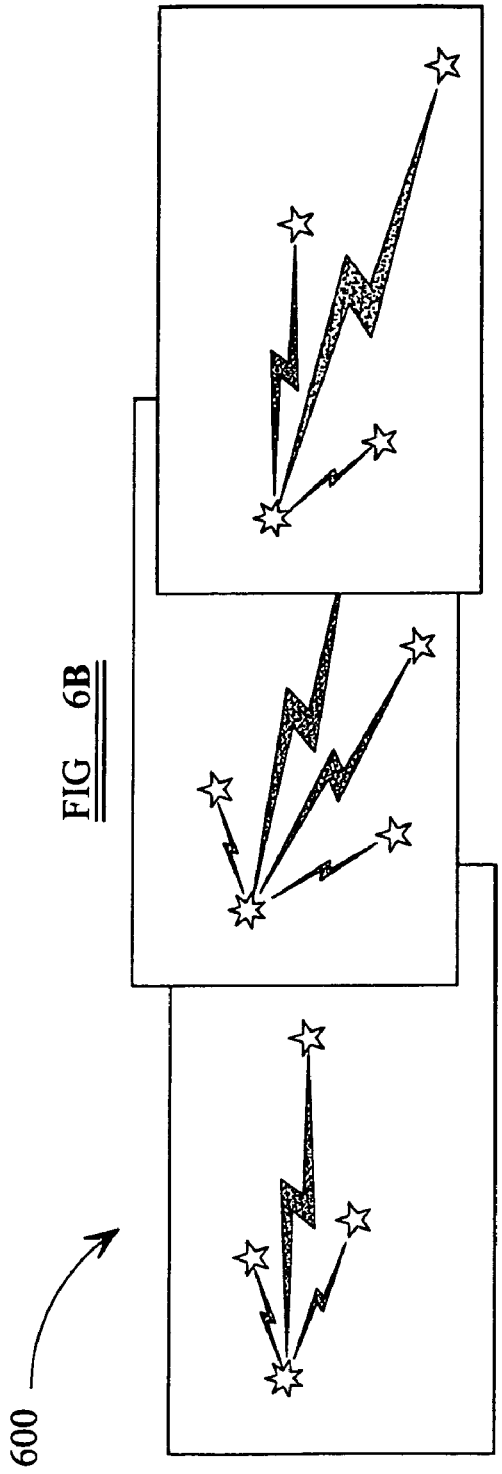
Figure 6C:
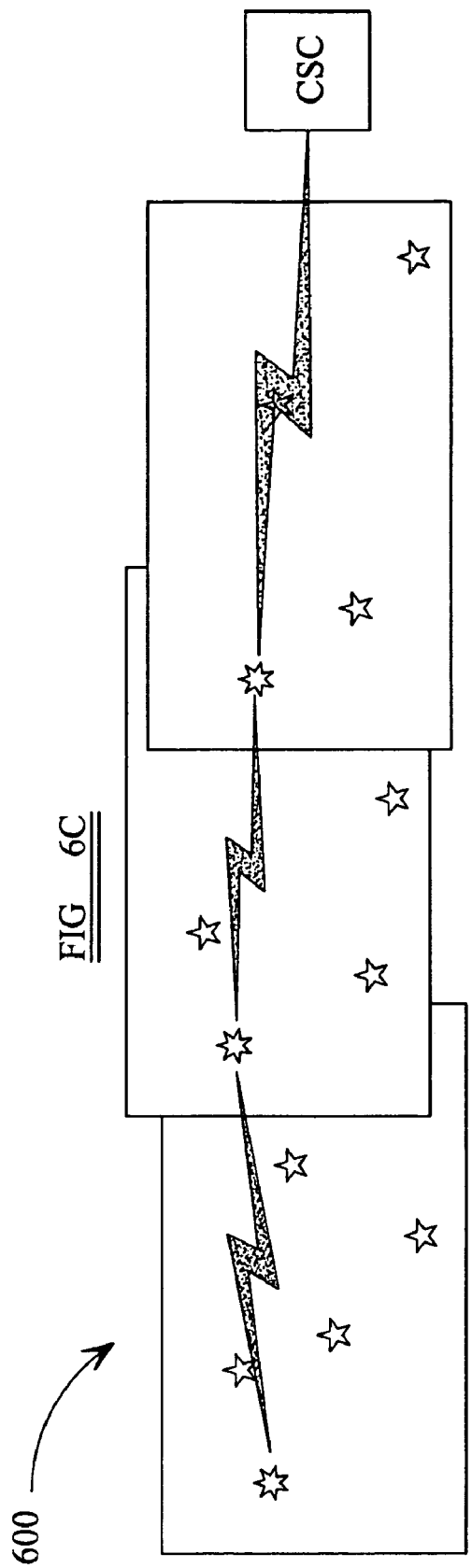

In the embodiment illustrated in FIG. 2, neither the BDACs 205, 210 nor the GDACs 200 overlap. However, this is not necessary to the practice of the invention. Indeed, where increased transmission bandwidth is desired, two or more GDACs 200 may overlap. Consider the embodiment 600 in FIG. 6A. In FIG. 6A, each GDAC 605 comprises a gateway BDAC 610 (only one indicated) and multiple BDACs 615 (only one indicated) that do not serve as gateways. The GDACs 605 overlap, and the overlap defines a length L for the GDACs 605 different from their coverage range R. Note that the overlaps vary and, consequently, $L_{i-1} \ne L_i \ne L_{i+1}$. Note also that the coverage range R is less than the maximum coverage range $R_{max}$, i.e., $R_i < R_{imax}$. One consequence of the difference between the actual range R and the maximum range $R_{max}$ is a "secure overlap." The overlap is secure in the sense that it provides a spatial margin for error in data transmission. FIG. 6B illustrates communications between the BDACs 615 and the gateway BDAC 610 in each GDAC 605. FIG. 6C illustrates communications between the GDACS 605.

Note that these physical characteristics can impact operational performance. For instance, Table 1 illustrates how the GDAC length L impacts bit rates under two different 802.11 standard specifications.

TABLE 1

GDAC Length L vs. Bit Rates

|  | 750 m | 500 m | 250 m | 150 m | 60 m | 50 m | 35 m | 25 m |
|---|---|---|---|---|---|---|---|---|
| In door (54 Mbps) | X | X | X | X | 5 Mbps | 10 Mbps | 35 Mbps | 54 Mbps |
| In door (11 Mbps) | X | X | X | X | 1 Mbps | 2 Mbps | 5.5 Mbps | 11 Mbps |
| Out door (54 Mbps) | X | X | X | X | X | X | X | X |
| Out door (11 Mbps) | 1 Mbps | 2 Mbps | 5.5 Mbps | 11 Mbps | 11 Mbps | 11 Mbps | 11 Mbps | 11 Mbps |

Those skilled in the art having the benefit of this disclosure will also appreciate other ways in which the physical characteristics of the GDACs affect operational performance. For instance, the distance between the gateways 610 may be limited to meet transmission licensing constraints and/or to improve reliability. Note that the characteristics presented in Table might change over time due to improvements in the seismic survey system and/or protocols employed.

Figure 7:
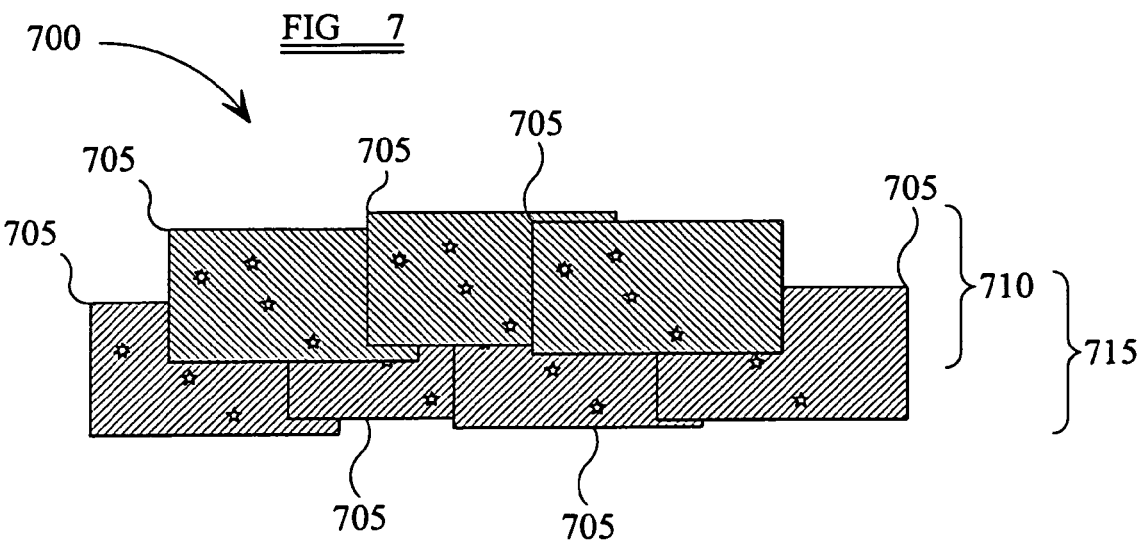
FIG. 7 illustrates a second embodiment alternative to that in FIG. 6A, FIG. 6B, and FIG. 6C in which the grouped data acquisition cells not only overlap, but are interleaved.

Other variations may also be employed. GDACs may, for instance, also be interleaved, and communications may be conducted using more than one carrier frequency. Consider the embodiment 700 in FIG. 7, in which the GDACs 705 are interleaved and in which the GDACS 705 communicating on different carrier frequencies are indicated in different batch patterns. Thus, the "top" line 710 communicates on a first carrier frequency and the "bottom" line 715 communicates on a second frequency. Each of the lines 710, 715 communicates in the manner illustrated by FIG. 6A-FIG. 6C, with communications within GDACs 705 conducted as shown in FIG. 6B and communications between GDACs 705 conducted as shown in FIG. 6C. Eventually, the data communicated through the top line 710 and through the bottom line 715 is transmitted to the CSC, e.g., the recording truck 110 or the fixed-base facility 140 in FIG. 1. Note, however, that communications through the top line 710 on the first carrier frequency constitute a separate, independent pathway to the CSC relative to the communications through the bottom line 715.

Figure 8B:
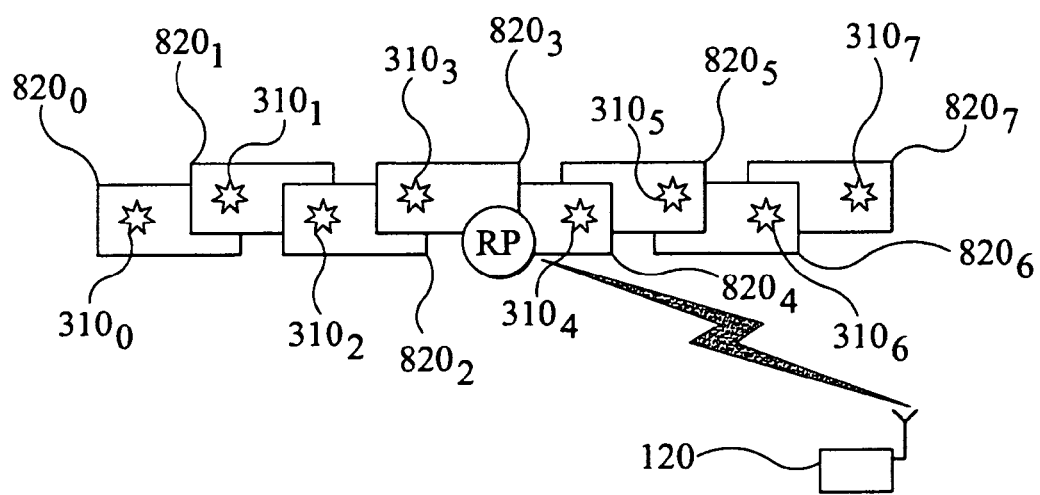
FIG. 8A and FIG. 8B illustrate a third embodiment alternative to those in FIG. 6A, FIG. 6B, and FIG. 6C and in FIG. 7 in which relay points are employed between interleaved grouped data acquisition cells and the data collection unit to improve bandwidth.
Figure 8A:
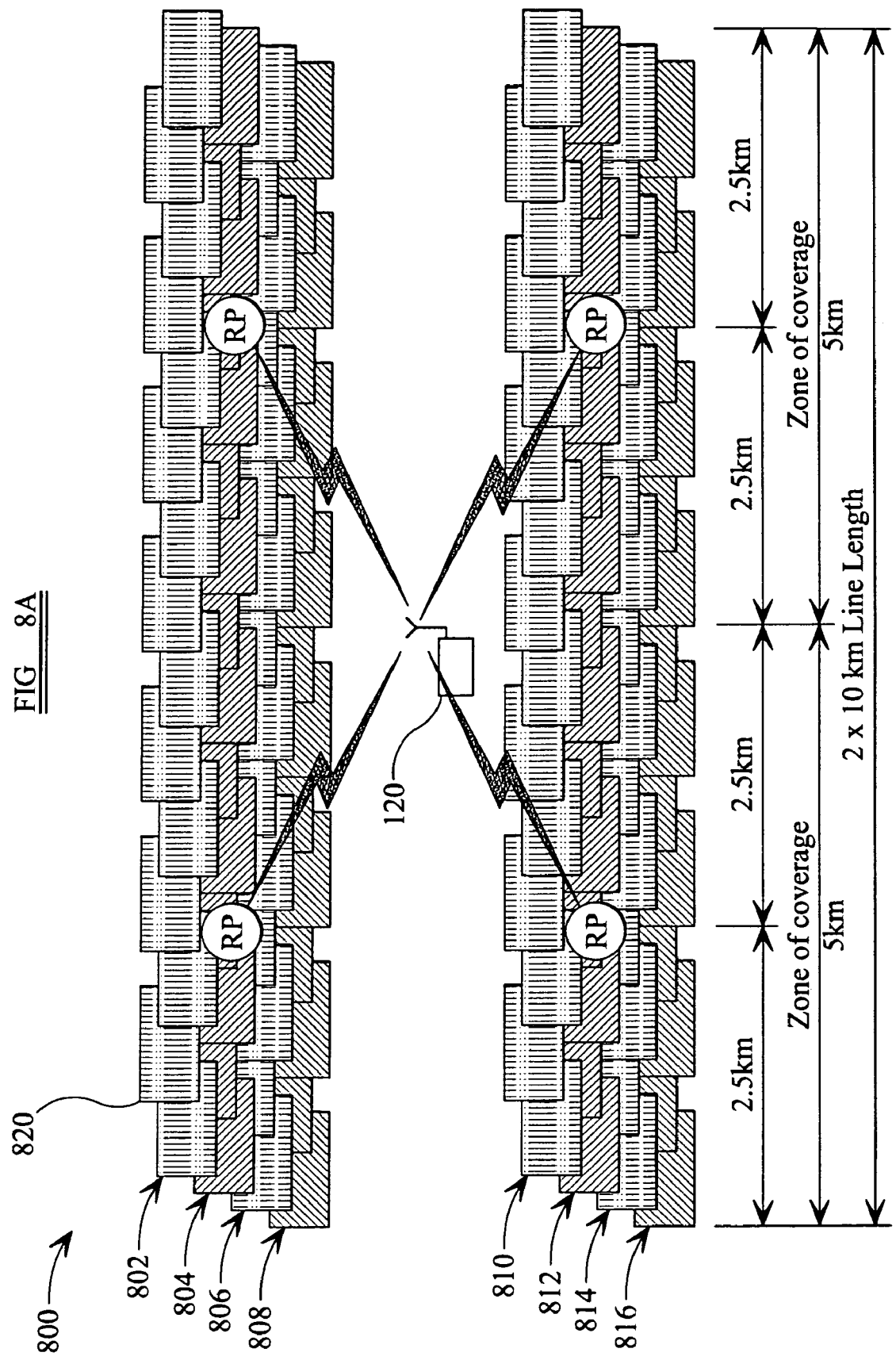

In larger spreads, bandwidth can be increased by the use of "relay points" on the independent pathways. FIG. 8A illustrates one such embodiment 800, which is a 10 km long spread, divided into two 5 km long "zones of coverage." Each zone of coverage is separated into 2.5 km areas. Each relay point RP is positioned, in this particular embodiment, to roughly divides the 5 km zone of coverage into the 2.5 km areas. Note that the distances are not material to the practice of the invention. Similarly, the relay points RP need not necessarily divide the zone of coverage in half in all implementations of this embodiment.

The relay points RP act as wireless bridges between the data acquisition and the data collection. In the illustrated embodiment, they are implemented using Cisco Aironet 340 Series Wireless Bridges commercially available "off the shelf" from Cisco Systems, Inc., 170 West Tasman Dr., San Jose, Calif. 95134, U.S.A. Information about these bridges is readily available at this address, by phone at (800) 553-NETS, or over the World Wide Web at www.cisco.com. However, the invention is not so limited and any suitable electronic device may be used.

Still referring to FIG. 8A, the spread comprises 8 "lines" 802-816 of GDACs 820 (only one indicated). Each line 802-816 operates on one of four carrier frequencies indicated by four different hatching patterns. Thus, lines 802, 810 operate on a first carrier frequency; lines 804, 812 operate on a second carrier frequency; lines 806, 814 operate on a third carrier frequency; and lines 808, 816 operate on a fourth carrier frequency.

In operation, the GDACs 820 transmit their data in the asynchronous mode discussed above, as shown in FIG. 8B. As the gateway $310_0$ gathers data collected in the GDAC $820_0$, it transmits it to the gateway $310_1$. The gateways $310_1$, $310_2$ act similarly with respect to data collected from the its respective $GDAC_1$, $GDAC_2$ and preceding $GDAC$ $820_0$, $820_1$, respectively. Data is handled in the same manner by the gateways $310_6$, $310_7$. However, the data does not continue to cascade across all GDACs 820 in the lines 802-816. Instead, the gateways $310_3$, $310_4$ transmit data collected by their $GDAC_3$, $GDAC_4$ and the preceding GDACs in its independent pathway to the relay point RP, which relays the data to the data collection unit 120.

Returning now to FIG. 8A, each relay point RP serves one 5 km zone of coverage for one set of lines 802-808, 810-816. Thus, in the illustrated embodiment, each line 802-816 includes two gateways $310_3$, $310_4$, as shown in FIG. 8B, that transmit to a relay point RP, which then relays the data to the data collection unit 120. In one particular implementation, the invention achieved performance as good as or better than conventional wired acquisition systems. This performance included a bandwidth of 144 kbps×N, where N is the number of sensors (up to 100,000 "1D" or "3D" geophones); real time data acquisition and transmission to a central system for computing and storing, and a range of 10 km×5 km for the spread. Table 2 presents some operational parameters for an implementation such as that in FIG. 8A, FIG. 8B, assuming 11 Mbps and two relay points with an 802.11 protocol.

TABLE 2

Operational Parameters

| Compression | "1D" Geophone | "3D" Geophone |
|---|---|---|
| None | 20 m ≦ BDAC ≦ 50 m cell ≦ 250 m | BDAC = 50 m cell ≦ 250 m |

TABLE 2-continued

Operational Parameters

| Compression | "1D" Geophone | "3D" Geophone |
|---|---|---|
| Compression factor = 2 | 10 m ≦ BDAC ≦ 50 m cell ≦ 250 m | 30 m ≦ BDAC ≦ 50 m cell ≦ 250 m |

Figure 9:
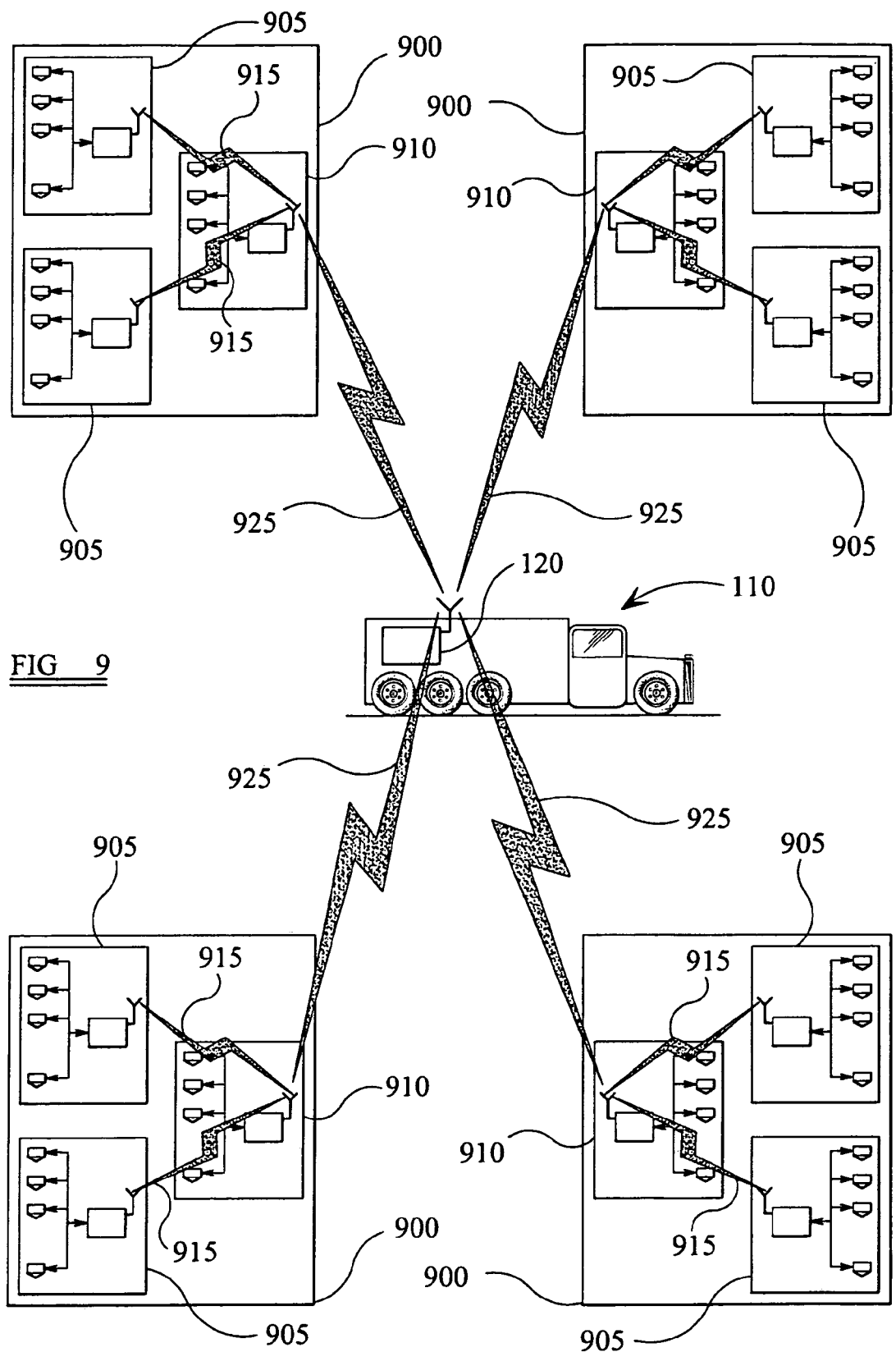
FIG. 9 illustrates a fourth embodiment alternative to those in FIG. 6A, FIG. 6B, and FIG. 6C, in FIG. 7, and in FIG. 8A and FIG. 8B.

Note that the practice of the invention does not require that the data be transmitted from one GDAC to another in the "cascaded" fashion shown in the embodiments discussed above. In sufficiently small spreads, such as the one shown in FIG. 9, comprising only a few GDACs 900, the BDACs 905 transmit the data they collect to the gateway BDAC 910 as was discussed above. However, the gateway BDACs 910 transmit their data and the data received from the other BDACs 905 directly to the data collection unit 120, rather than through other GDACs 900. Thus, the wireless links 925 constitute the independent pathways in such an embodiment.

Note also that, in the illustrated embodiments, all the communications pathways are shown as substantially linear, the cells are shown have rectangular geometries, and the cells are arranged in "lines" running left to right. However, these conventions are employed for ease and clarity in illustration, and the invention is not limited in these respects. The cells may employ other geometries, and the communications pathways may be substantially non-linear in alternative embodiments. Also, the left to right orientation of the lines in the illustrated embodiments is a convenience for clarity in illustration. The invention admits wide variation in these aspects.

The particular embodiments disclosed above are illustrative only, as the invention may be modified and practiced in different but equivalent manners apparent to those skilled is in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A seismic survey system, comprising:
   a plurality of transmitters;
   a plurality of data sources positioned about an area to be surveyed, each data source, when in operation, communicating with one of the transmitters that, when in operation, transmits data from the data sources;
   a plurality of cells each containing a portion of the data sources and the transmitters with which they communicate, one of the transmitters within each cell also serving as a gateway during operation for receiving data transmitted from the other data source transmitters within the cell and transmitting the data collected within the cell; and
   a plurality of independent pathways, each independent pathway containing a least one gateway through which data is transmitted during operation along each pathway via at least one gateway in that pathway without consolidation of data.

2. The seismic survey system of claim 1, further wherein the transmitter comprise transmitters that, in operation, wirelessly transmits data.

3. The seismic survey system of claim 1, further comprising a computing and storing center for receiving the data transmitted along each pathway.

4. The seismic survey system of claim 3, further comprising at least a pair of relay points through which the data transmitted along each independent pathway is relayed to the computing and storing center.

5. The seismic survey system of claim 1, further comprising a fixed-base facility to which the data is transmitted.

6. The seismic survey system of claim 5, further comprising a recording truck through which the data is transmitted to the fixed-base facility.

7. The seismic survey system of claim 1, wherein the transmitters comprise transmitters that, in operation, transmit data in an asynchronous mode.

8. The seismic survey system of claim 1, wherein the transmitters comprise transmitters that, in operation, transmit data in a synchronous mode.

9. The seismic survey system of claim 1, wherein the data is transmitted along each independent pathway according to frequency division multiplexing.

10. The seismic survey system of claim 1, wherein the data is transmitted along each pathway according to time division multiplexing.

11. The seismic survey system of claim 1, wherein the distance between gateways of adjacent cells is limited according to transmission licensing constraints.

12. The seismic survey system of claim 1, wherein the distance between gateways of adjacent cells is limited to improve reliability.

13. The seismic survey system of claim 1, wherein the pathways are substantially linear.

14. The seismic survey system of claim 1, wherein the cells overlap.

15. The seismic survey system of claim 1, wherein the cells are interleaved.

16. A seismic survey system of claim 1, wherein no gateway in a path directly receives data from more than one gateway or directly transmits data to more than one gateway.

17. The seismic survey system of claim 1, wherein at least one cell is arranged to, in addition to transmitting date from data source in the cell, relay, in use, data received from a gateway of another cell.

18. A method for use in seismic surveying, comprising:
   collecting a plurality of seismic data at a plurality of seismic data sources, each data sources communicating with a transmitter that, in operation, transmits data, the seismic data sources being organized into a plurality of cells, one of the transmitters within each cell also serving as a gateway for receiving data transmitted from the other data source transmitters within the cell;
   transmitting the collected seismic data over a plurality of independent pathways to a central location, each independent pathway containing at least one gateway through which data is transmitted during operation along each pathway via the at least one gateway without consolidation of data; and
   collecting the transmitted seismic data at the central location.

19. The method of claim 18, wherein transmitting the collected seismic data includes transmitting the collected seismic data using one of frequency division multiplexing and time division multiplexing.

20. The method of claim 18, wherein the cell definitions are constrained with transmission licensing constraints.

21. The method of claim 18, wherein the distance between cells is constrained to improve reliability.

22. The method of claim 18, wherein the cells overlap.

23. The method of claim 18, wherein cells are interleaved.

24. The method of claim 18, wherein defining the independent pathways include at least a pair of relay points through which the collected seismic data is transmitted to the central location.

25. The method of claim 18, wherein no gateway in a path directly receives data from more than one gateway or directly transmits data to more than one gateway.

* * * * *